US009974011B2

(12) United States Patent
Liu

(10) Patent No.: US 9,974,011 B2
(45) Date of Patent: May 15, 2018

(54) NETWORK ACCESS METHOD AND MOBILE COMMUNICATIONS TERMINAL

(71) Applicant: GUANGDONG OPPO MOBILE TELECOMMUNICATIONS CORP., LTD., Dongguan, Guangdong (CN)

(72) Inventor: Hai Liu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days. days.

(21) Appl. No.: 15/329,398

(22) PCT Filed: Mar. 24, 2016

(86) PCT No.: PCT/CN2016/077203
§ 371 (c)(1),
(2) Date: Jan. 26, 2017

(87) PCT Pub. No.: WO2016/173348
PCT Pub. Date: Nov. 3, 2016

(65) Prior Publication Data
US 2017/0223622 A1 Aug. 3, 2017

(30) Foreign Application Priority Data
Apr. 30, 2015 (CN) .......................... 2015 1 0217564

(51) Int. Cl.
*H04W 4/00* (2018.01)
*H04W 48/18* (2009.01)
(Continued)

(52) U.S. Cl.
CPC ............. *H04W 48/18* (2013.01); *G01S 19/42* (2013.01); *H04W 4/06* (2013.01); *H04W 48/16* (2013.01); *H04W 60/04* (2013.01); *H04W 64/00* (2013.01)

(58) Field of Classification Search
CPC ............................... H04W 60/00; H04W 36/30
(Continued)

(56) References Cited

U.S. PATENT DOCUMENTS 8,774,802 B2 7/2014 Kim
2004/0192328 A1 9/2004 Giacalone et al.
(Continued)

FOREIGN PATENT DOCUMENTS

CN 1768542 A 5/2006
CN 101212802 A 7/2008
(Continued)

OTHER PUBLICATIONS

International Search Report dated Jun. 23, 2016, corresponding to International Publication No. PCT/CN2016/077203.
(Continued)

*Primary Examiner* — Kiet Doan
(74) *Attorney, Agent, or Firm* — Hauptman Ham, LLP

(57) ABSTRACT

Disclosed are a network access method and a mobile communications terminal, said method comprising the following steps: obtaining the geographical location information of a mobile communications terminal; if the geographical location information of said mobile communications terminal is not the home geographical location information of the mobile communications terminal, then selecting, according to the geographical location information of said mobile communications terminal, a visited public land mobile network matching said geographical location information; adding said visited public land mobile network to an equivalent public land mobile network list; searching for a network according to the appended equivalent public land mobile network list, and if the visited public land mobile network is found, then executing a network registration operation for said mobile communications terminal.

9 Claims, 5 Drawing Sheets

(51) Int. Cl.
*H04W 48/16* (2009.01)
*H04W 60/04* (2009.01)
*H04W 4/06* (2009.01)
*H04W 64/00* (2009.01)
*G01S 19/42* (2010.01)

(58) Field of Classification Search
USPC ............... 455/435.2, 436, 435.3, 433, 432.1; 370/331, 338, 329
See application file for complete search history.

(56) References Cited

U.S. PATENT DOCUMENTS

| | | | |
|---|---|---|---|
| 2006/0052100 | A1 | 3/2006 | Almgren |
| 2007/0191006 | A1 | 8/2007 | Carpenter |
| 2009/0196265 | A1* | 8/2009 | Mariblanca Nieves ........... H04W 8/065 370/338 |
| 2012/0064883 | A1 | 3/2012 | Kim |
| 2013/0109377 | A1* | 5/2013 | Al-Khudairi ......... H04W 48/16 455/432.1 |
| 2014/0073320 | A1 | 3/2014 | Dhanda et al. |
| 2014/0235241 | A1 | 8/2014 | Sharan et al. |

FOREIGN PATENT DOCUMENTS

| | | |
|---|---|---|
| CN | 103716774 A | 4/2014 |
| CN | 103906180 A | 7/2014 |
| CN | 104486818 A | 4/2015 |
| CN | 104869615 A | 8/2015 |
| CN | 105101081 A | 11/2015 |
| EP | 2429224 A1 | 3/2012 |

OTHER PUBLICATIONS

The extended European search report dated Jan. 4, 2018 in connection with the counterpart European Patent Application No. 16785779.6, citing the above reference(s).

* cited by examiner

NETWORK ACCESS METHOD AND MOBILE COMMUNICATIONS TERMINAL

CROSS REFERENCE TO RELATED APPLICATION

This application is a US national phase application based upon an International Application No. PCT/CN2016/077203, filed on Mar. 24, 2016, which claims priority to Chinese Application No. 201510217564.5, filed Apr. 30, 2015. The entire disclosures of each of the above applications are incorporated herein by reference.

BACKGROUND OF THE DISCLOSURE

1. Field of the Disclosure

The present disclosure relates to a mobile communication technology, more particularly, to a method and a mobile communication terminal of accessing a network.

2. Description of the Related Art

A public land mobile network is a network established and operated by the government or operators authorized by the government to provide the public with land mobile communication services. This network needs to be interconnected with a public switched telephone network (PSTN) so as to form a regional or nationwide communication network. When a subscriber roams, the subscriber's mobile communication terminal, such as a mobile phone, needs to re-access the network so as to obtain the information of the public land mobile network.

Currently, most of the mobile communication terminals, when being turned on, will search the registered public land mobile network (RPLMN) first, then select the equivalent home public land mobile network (EHPLMN) or the home public land mobile network (HPLMN). When a subscriber goes from a home location to a visited location, returns from a visited location to a home location, or goes from a visited location A to a visited location B, the mobile communication terminal can not determine whether it is located at the visited location or the home location or not at this point. According to the current network access technology, when the mobile communication terminal is in a roaming status and needs to re-access the network, the default choice is to continue to search the currently visited public land mobile network (VPLMN) or the MAIN. If the geographical location of the mobile communication terminal is not within the range of the currently visited location or home location, the mobile communication terminal will continue to search for the network coverage of the public land mobile network that does not match the current situation by default. As a result, a large amount of time is consumed and the network access efficiency is significantly reduced.

SUMMARY

The present disclosure provides a method and a mobile communication terminal of accessing a network to select a VPLMN according to geographical location information, thus being able to reduce time spent by the mobile communication terminal in network searching and increase the network access efficiency.

In a first aspect of the present disclosure, a method of accessing a network is provided. The method includes as follows:

Geographical location information of a mobile communication terminal is obtained.

A VPLMN matching the geographical location information is selected according to the geographical location information of the mobile communication terminal when the geographical location information of the mobile communication terminal is not geographical location information of a home location of the mobile communication terminal.

The VPLMN is added to an equivalent public land mobile network (EPLMN) list; and A network search is performed according to the EPLMN list thus added, and a network registration operation of the mobile communication terminal is performed when the VPLMN is searched.

According to an embodiment in conjunction to the first aspect of the present disclosure, obtaining the geographical location information of the mobile communication terminal includes the following operation.

The geographical location information of the mobile communication terminal is obtained through using a global positioning system of the mobile communication terminal.

According to an embodiment in conjunction to the first aspect of the present disclosure, the method further comprises the following step before the VPLMN matching the geographical location information is selected according to the geographical location information of the mobile communication terminal when the geographical location information of the mobile communication terminal is not the geographical location information of the home location of the mobile communication terminal.

Information of a matching table is preset. The preset information of the matching table includes the geographical location information. VPLMNs having a matching relationship with the geographical location information, the geographical location information of the home location, and an HPLMN having a matching relationship with the geographical location information of the home location. The matching table is configured to select the VPLMN matching the geographical location information according to the geographical location information of the mobile communication terminal.

According to an embodiment in conjunction to the first aspect of the present disclosure, the method further comprises the following step before the VPLMN to the EPLMN list is added.

The HPLMN is added to the EPLMN list.

According to an embodiment in conjunction to the first aspect of the present disclosure, the network search is performed according to the EPLMN list, and the network registration operation of the mobile communication terminal is performed when the VPLMN is searched. The method includes the following steps.

A broadcasting-network access instruction is transmitted according to the EPLMN list thus added to perform a network searching operation.

The network registration operation of the mobile communication terminal is performed when any one network of the VPLMNs in the EPLMN list is searched.

In a second aspect of the present disclosure, a mobile communication terminal is provided. The mobile communication terminal includes an acquisition unit, a selection unit, a visited location adding unit, and an execution unit.

The acquisition unit is configured to obtain geographical location information of the mobile communication terminal.

The selection unit is configured to select a VPLMN snatching the geographical location information according to the geographical location information of the mobile communication terminal when the geographical location information of the mobile communication terminal is not geographical location information of a home location of the mobile communication terminal.

The visited location adding unit is configured to add the VPLMN to an EPLMN list.

The execution unit is configured to perform a network search according to the EPLMN list thus added, and perform a network registration operation of the mobile communication terminal when the VPLMN is searched.

According to an embodiment in conjunction to the second aspect of the present disclosure, the acquisition unit is configured to obtain the geographical location information of the mobile communication terminal through using a global positioning system of the mobile communication terminal.

According to an embodiment in conjunction to the second aspect of the present disclosure, the mobile communication terminal further includes a preset unit.

The preset unit is configured to preset information of a matching table. The preset information of the matching table includes the geographical location information, VPLMNs having a matching relationship with the geographical location information, the geographical location information of the home location, and an HPLMN having a matching relationship with the geographical location information of the home location. The matching table is configured to select the VPLMN matching the geographical location information according to the geographical location information of the mobile communication terminal.

According to an embodiment in conjunction to the second aspect of the present disclosure, the mobile communication terminal further includes a home location adding unit.

The home location adding unit is configured to add the HPLMN to the EPLMN list.

According to an embodiment in conjunction to the second aspect of the present disclosure, the mobile communication terminal further includes a network searching subunit and a network registration subunit.

The network searching subunit is configured to transmit a broadcasting-network access instruction according to the EPLMN list thus added to perform a network searching operation.

The network registration subunit is configured to perform the network registration operation of the mobile communication terminal when any one network of the VPLMNs in the EPLMN list is searched.

In a third aspect of the present disclosure, a mobile communication terminal including a processor and a memory storing a plurality of program instructions executable by the processor to perform the following steps.

Geographical location information of a mobile communication terminal is obtained.

A VPLMN matching the geographical location information is selected according to the geographical location information of the mobile communication terminal when the geographical location information of the mobile communication terminal is not geographical location information of a home location of the mobile communication terminal.

The VPLMN is added to an EPLMN list.

A network search is performed according to the EPLMN list thus added, and a network registration operation of the mobile communication terminal is performed when the VPLMN is searched.

According to an embodiment in conjunction to the second aspect of the present disclosure, when the processor executes the plurality of program instructions to obtain the geographical location information of the mobile communication terminal, the processor executes the plurality of program instructions to perform a following step.

The geographical location information of the mobile communication terminal is obtained through using a global positioning system of the mobile communication terminal.

According to an embodiment in conjunction to the second aspect of the present disclosure, the processor further executes the plurality of program instructions to perform the following step before the VPLMN matching the geographical location information is selected according to the geographical location information of the mobile communication terminal when the geographical location information of the mobile communication terminal is not the geographical location information of the home location of the mobile communication terminal.

Information of a matching table is preset. The preset information of the matching table includes the geographical location information, VPLMNs having a matching relationship with the geographical location information, the geographical location information of the home location, and an having a matching relationship with the geographical location information of the home location. The matching table is configured to select the VPLMN matching the geographical location information according to the geographical location information of the mobile communication terminal.

According to an embodiment in conjunction to the second aspect of the present disclosure, the processor further executes the plurality of program instructions to perform the following step before the VPLMN to the EPLMN list is added.

The HPLMN to the EPLMN list is added.

According to an embodiment in conjunction to the second aspect of the present disclosure, the processor executes the plurality of program instructions to perform the network search according to the EPLMN list thus added, and to perform the network registration operation of the mobile communication terminal when the VPLMN is searched, the processor executes the plurality of program instructions to perform the following steps.

A broadcasting-network access instruction is transmitted according to the EPLMN list thus added to perform a network searching operation.

The network registration operation of the mobile communication terminal is performed when any one network of the VPLMNs in the EPLMN list is searched.

According to the embodiments of the present disclosure, through obtaining the geographical location information of the mobile communication terminal, the VPLMN matching the geographical location information is selected according to the geographical location information of the mobile communication terminal when the geographical location information of the mobile communication terminal is not geographical location information of a home location of the mobile communication terminal. The VPLMN is added to the EPLMN list. The network search is performed according to the EPLMN list thus added. The network registration operation of the mobile communication terminal is performed when the VPLMN is searched. By using the method in which the VPLMN is selected according to the geographical location information, the time spent by the mobile communication terminal in network searching can be reduced to increase the network access efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

A public land mobile network (PLMN) is a wireless communication system, which is a network established and operated by the government or operators authorized by the government to provide the public with land mobile communication services. This network is usually interconnected with a public switched telephone network (PSTN) so as to form a regional or nationwide communication network. The PLMN includes the following types:

(1). Registered public land mobile network (RPLMN): a PLMN that is registered before a mobile communication terminal is last turned off or offline.

(2). Equivalent public land mobile network (EPLMN): a PLMN has a same rank as a PLMN currently selected by the mobile communication terminal, both have the same priority.

(3). Home public land mobile network (HPLMN): a PLMN to which a subscriber of the mobile communication terminal belongs, which can be identified through a universal subscriber identity module (USIM) of the mobile communication terminal, for a specific subscriber, there is only one PLMN for a home location.

(4). Equivalent home public land mobile network (EHPLMN): a local PLMN has the same rank as the MIN currently selected by the mobile communication terminal.

(5). Visited public land mobile network (VPLMN): a PLMN visited by the subscriber of the mobile communication terminal. The PLMN and Mobile county Code (MCC), Mobile Network Code (MNC) of International Mobile Subscriber Identity (IMSI) existing in a SIM card are not completely the same, when the mobile communication terminal loses coverage, one VPLMN will be selected.

In all of the following embodiments, the mobile communication terminal may include a smart phone, a tablet computer, a notebook computer, a palmtop computer, and a mobile Internet device (MID), etc. The mobile communication terminal in the present embodiment mainly refers to a smart mobile communication terminal device, such as a smart phone or a tablet computer, which can perform communication network connections. The home location is a home location of a home operator described in a subscriber identity module inside the mobile communication terminal. The visited location is a destination visited by a subscriber carrying the mobile communication terminal.

Detailed descriptions of methods of accessing networks according to embodiments of the present disclosure are provided as follows with reference to FIG. 1 to FIG. 2.

Figure 1:
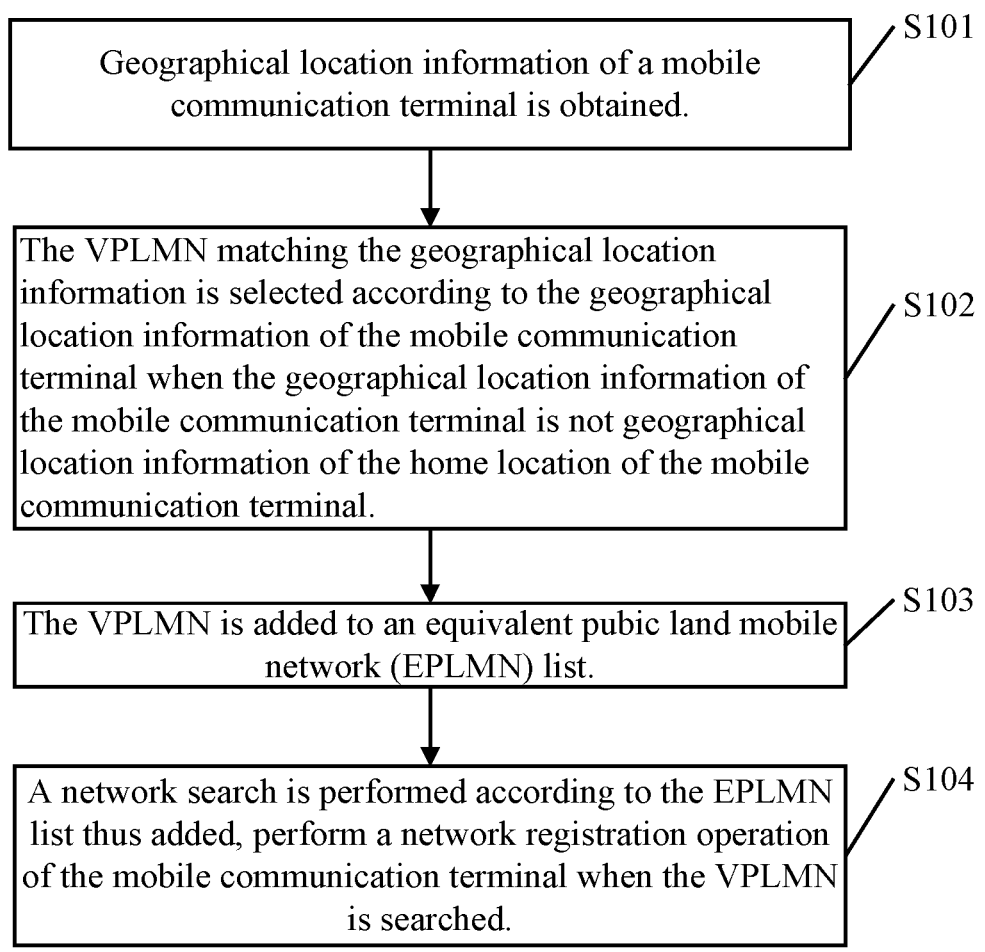
FIG. 1 is a flow chart of a method for connecting to a network according to an embodiment of the present disclosure.

A description is provided with reference to FIG. 1. FIG. 1 is a flow chart of a method for connecting to a network according to an embodiment of the present disclosure. The method includes but is not limited to the following blocks:

Block S101: Geographical location information of a mobile communication terminal is obtained.

In greater detail, when a subscriber carrying the mobile communication terminal goes from a home location to a visited location, or goes from a visited location A to a visited location B, the mobile communication terminal is turned on again after a network is switched or after the mobile communication terminal reaches a destination. When a network of a current destination is searched, the geographical location information of the subscriber carrying the mobile communication terminal needs to be obtained so as to obtain a VPLMN correspondingly. A geographical location of the mobile communication terminal can be obtained through a variety of positioning methods, such as a global positioning system (GPS) carried by the mobile communication terminal itself.

Block S102: The VPLMN matching the geographical location information is selected according to the geographical location information of the mobile communication terminal when the geographical location information of the mobile communication terminal is not geographical location information of the home location of the mobile communication terminal.

In greater detail, when the geographical location information of the mobile communication terminal is not the geographical location information of the home location of the mobile communication terminal, the VPLMN matching the geographical location information is selected according to the geographical location information of the mobile communication terminal. In the present embodiment, whether position information of the mobile communication terminal thus obtained is the geographical location information of the home location of the mobile communication terminal is determined according to the position information of the mobile communication terminal thus obtained. If it is the geographical location information of the home location of the mobile communication terminal, a HPLMN having a matching relationship with the geographical location information of the home location can be directly obtained from a preset matching table; if it is not the geographical location information of the home location of the mobile communication terminal, the VPLMN matching the geographical location information is selected according to the geographical location information of the mobile communication terminal.

Block S103: The VPLMN is added to an equivalent pubic land mobile network (EPLMN) list.

In greater detail, the VPLMN is added to the EPLMN list. Since the PLMN has network identity information correspondingly, network identity of the VPLMN is preferably added to the EPLMN list. The network identity corresponds to network identity of an EPLMN. For example, the operator China Mobile has four network codes, namely, 46000, 46002, 46007 and 46008, and the operator China Unicorn has three network codes 46001, 46006 and 46009, all of them are EPLMNs. The EPLMN list is stored in the mobile communication terminal, which is configured to store all the EPLMNs required during the network searching process.

Block S104: A network search is performed according to the EPLMN list thus added, and a network registration operation of the mobile communication terminal is performed when the VPLMN is searched.

In greater detail, perform the network search according to the EPLMN list thus added. Through a plurality of EPLMNs including the VPLMN and the HPLMN in the EPLMN list and the plurality of EPLMNs all having a same priority, a network that is first successfully searched during the network search serves as a network for the network registration operation of the mobile communication terminal. After the network is successfully searched, the network registration operation of the mobile communication terminal is performed according to the network or network identity thus searched.

According to the present embodiment, through obtaining the geographical location information of the mobile communication terminal, the VPLMN matching the geographical location information is selected according to the geographical location information of the mobile communication terminal when the geographical location information of the mobile communication terminal is not the geographical location information of the home location of the mobile communication terminal. The VPLMN is added to the EPLMN list. The network search is performed according to the EPLMN list thus added. When the VPLMN is searched, the network registration operation of the mobile communication terminal is performed. By using the method in which the VPLMN is selected according to the geographical location information, the time consumed by the mobile communication terminal in searching the network is reduced, thus increasing the network access efficiency.

Figure 2:
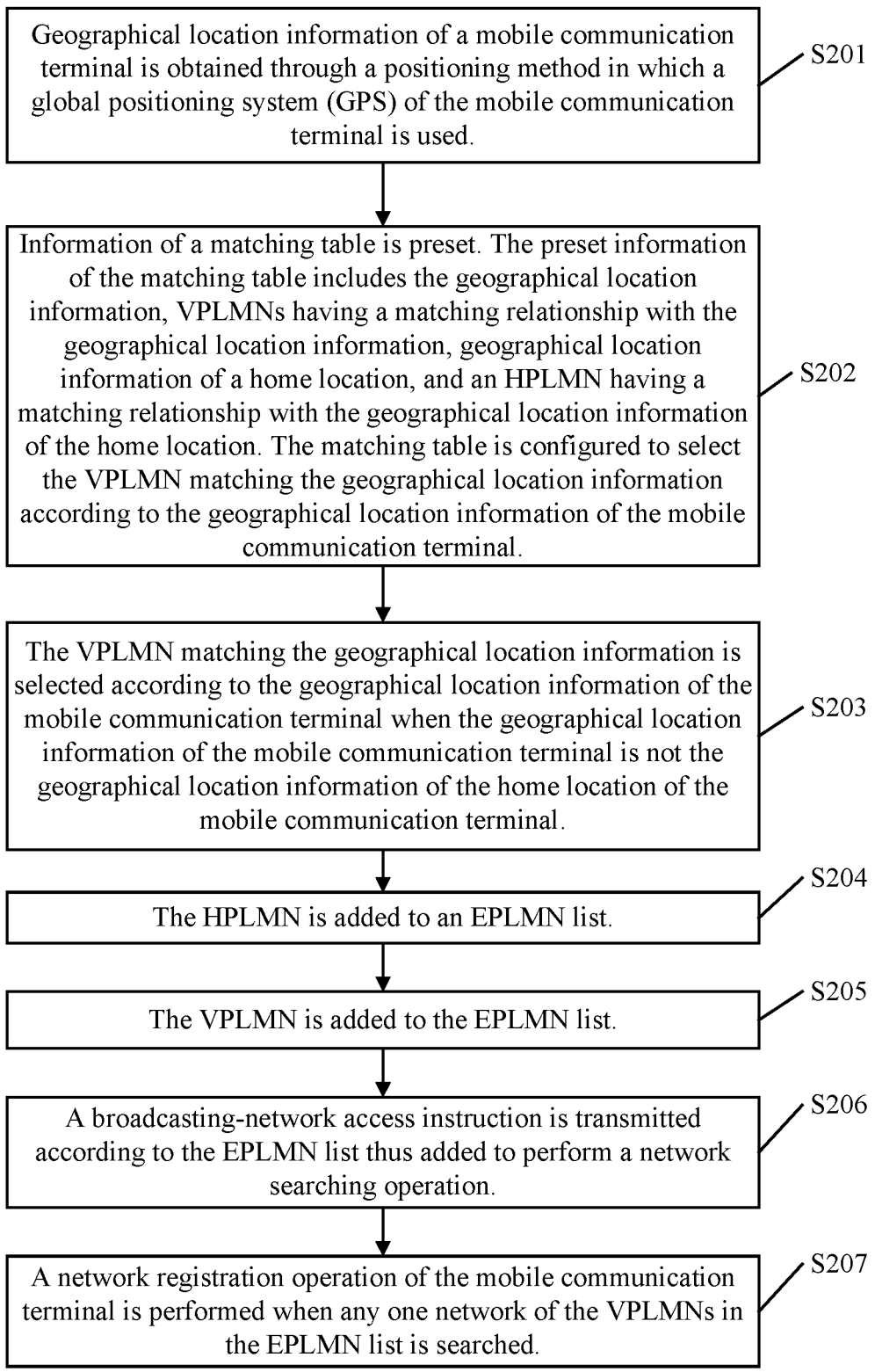
FIG. 2 is a flow chart of a method for connecting to a network according to another embodiment of the present disclosure.

A description is provided with reference to FIG. 2. FIG. 2 is a flowchart of a method of accessing a network according to a second embodiment of the present disclosure. The method includes but is not limited to the following blocks:

Block S201: Geographical location information of a mobile communication terminal is obtained through a positioning method in which a global positioning system (GPS) of the mobile communication terminal is used.

In greater detail, when a subscriber carrying the mobile communication terminal goes from a home location to a visited location, or goes from a visited location A to a visited location B, the mobile communication terminal is turned on again after a network is switched or after the mobile communication terminal reaches a destination. When a network of a current destination is searched, geographical location information of the subscriber carrying the mobile communication terminal needs to be obtained so as to obtain a VPLMN correspondingly. Since the mobile communication terminal, such as a smart phone, carries the function of a GPS, the geographical location information of the mobile communication terminal can be obtained by using the positioning method achieved by GPS of the mobile communication terminal.

Block S202: Information of a matching table is preset. The preset information of the matching table includes the geographical location information, VPLMNs having a matching relationship with the geographical location information, geographical location information of a home location, and an HPLMN having a matching relationship with the geographical location information of the home location. The matching table is configured to select the VPLMN matching the geographical location information according to the geographical location information of the mobile communication terminal.

In greater detail, after obtaining the geographical location information of the mobile communication terminal, it is necessary to obtain the VPLMN or the HPLMN according to the geographical location information of the mobile communication terminal thus obtained. Hence, the information of the matching table needs to be preset. The preset information of the matching table may be obtained through manually adding or through downloading a preset matching table when accessing a network in advance. The preset information of the matching table includes the geographical location information, and PLMNs having a matching relationship with the geographical location information. The PLMNs include the HPLMN and the VPLMNs.

Block S203: The VPLMN matching the geographical location information is selected according to the geographical location information of the mobile communication terminal when the geographical location information of the mobile communication terminal is not the geographical location information of the home location of the mobile communication terminal.

In greater detail, whether position information of the mobile communication terminal thus obtained is the geographical location information of the home location of the mobile communication terminal is determined according to the position information of the mobile communication terminal thus obtained. If it is the geographical location information of the home location of the mobile communication terminal, the HPLMN having the matching relationship with the geographical location information of the home location can be directly obtained from the preset matching table; if it is not the geographical location information of the home location of the mobile communication terminal, the VPLMN matching the geographical location information is selected according to the geographical location information of the mobile communication terminal.

Block S204: The HPLMN is added to an EPLMN list.

In greater detail, when the subscriber carrying the mobile communication terminal needs to return to the home location from the visited location, or needs to go from the home location to the visited location, the HPLMN can be read from the mobile communication terminal, and the HPLMN is added to the EPLMN list for the subsequent network searching process.

Block S205: The VPLMN is added to the EPLMN list.

In greater detail, when the subscriber carrying the mobile communication terminal needs to return to the home location from the visited location, or needs to go from the visited location A to the visited location B, the VPLMN can be read from the mobile communication terminal, and the VPLMN is added to the EPLMN list for the subsequent network searching process.

Block S206: A broadcasting-network access instruction is transmitted according to the EPLMN list thus added to perform a network searching operation.

In greater detail, a network search is performed according to the EPLMN list thus added. Through a plurality of EPLMNs including the VPLMNs and the HPLMN in the EPLMN list, the broadcasting-network access instruction includes all EPLMN information in the EPLMN list. When the network search is performed, the mobile communication terminal transmits the broadcasting-network access instruction and receives a broadcast message correspondingly to feed matched network information of the broadcast message that is successfully received back to the mobile communication terminal. When a feedback message is received, it shows that the mobile communication terminal successfully searches a PLMN.

Block S207: A network registration operation of the mobile communication terminal is performed when any one network of the VPLMNs in the EPLMN list is searched.

In greater detail, when the any one network of the VPLMNs in the EPLMN list is searched, for example, the visited location is China and China Unicom 46001 is searched, the network registration operation can be performed according to a network code.

According to the present embodiment, the geographical location information of the mobile communication terminal is obtained through the positioning method in which the GPS of the mobile communication terminal is used and the information of the matching table is preset. When the geographical location information of the mobile communication terminal is not the geographical location information of the home location of the mobile communication terminal, select the VPLMN matching the geographical location information according to the geographical location information of the mobile communication terminal and add the HPLMN and the VPLMN to the EPLMN list. Then, transmit the broadcasting-network access instruction according to the EPLMN list thus added to perform the network searching operation. When the any one network of the VPLMNs in the EPLMN list is searched, the network registration operation of the mobile communication terminal is performed. Through using the GPS positioning method to obtain the geographical location information and through using the geographical location information to obtain the matched PLMN, the positioning can be more accurate and the EPLMN can be rapidly obtained to reduce the time consumed in accessing the network and at the same time increase the network access efficiency.

Figure 3:
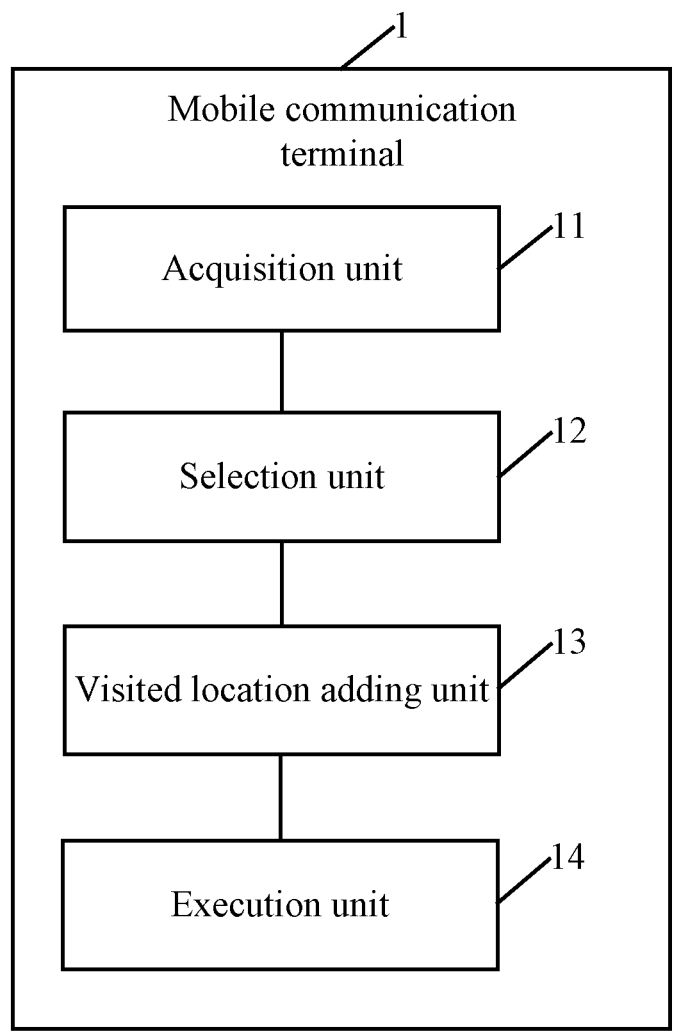
FIG. 3 is a block diagram of a mobile communication tetra according to a first embodiment of the present disclosure.
Figure 4:
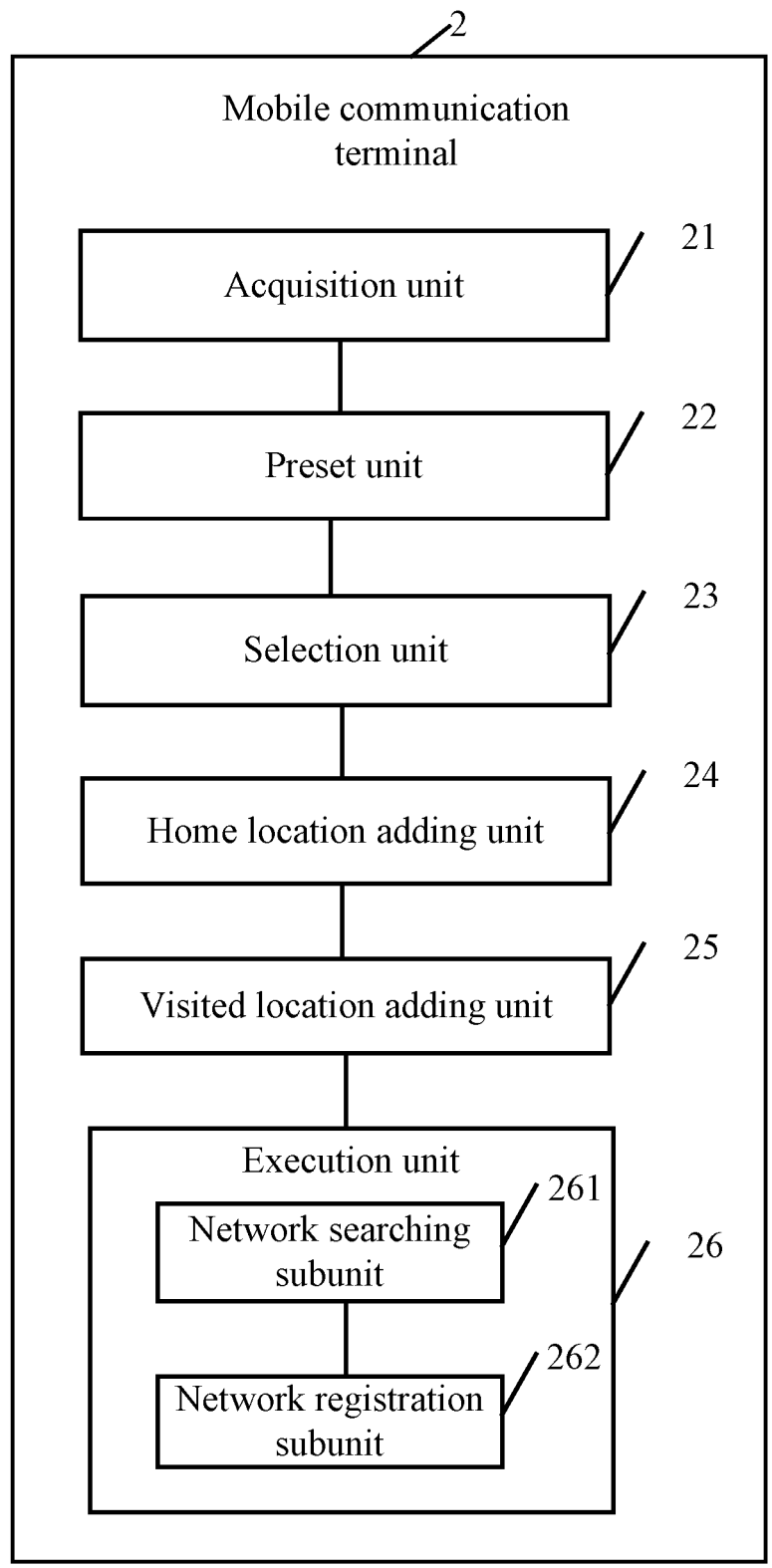
FIG. 4 is a block diagram of a mobile communication terminal according to a second embodiment of the present disclosure.

Descriptions are provided with reference to FIG. 3 to FIG. 4 as follows to provide detailed illustrations of mobile communication terminals according to embodiments of the present disclosure. It is noted that the mobile communication terminals shown in FIG. 3 to FIG. 4 are configured to perform the methods of accessing the networks shown in FIG. 1 to FIG. 2. To simplify matters, only parts relevant to the embodiments of present disclosure are shown, and technical details not disclosed may refer to the embodiments shown in FIG. 1 to FIG. 2 of the present disclosure.

A description is provided with reference to FIG. 3. FIG. 3 is a schematic diagram of a structure of a mobile communication terminal according to one embodiment of the present disclosure. A mobile communication terminal 1 includes an acquisition unit 11, a selection unit 12, a visited location adding unit 13, and an execution unit 14.

The acquisition unit 11 is configured to obtain geographical location information of the mobile communication terminal.

In greater detail, when a subscriber carrying the mobile communication terminal goes from a home location to a visited location, or goes from a visited location A to a visited location B, the mobile communication terminal is turned on again after a network is switched or after the mobile communication terminal reaches a destination. When a network of a current destination is searched, the geographical location information of the subscriber carrying the mobile communication terminal needs to be obtained so as to obtain a VPLMN correspondingly. A geographical location of the mobile communication terminal can be obtained through a variety of positioning methods, such as a global positioning system (GPS) carried by the mobile communication terminal itself.

The selection unit 12 is configured to select a VPLMN matching the geographical location information according to the geographical location information of the mobile communication terminal when the geographical location information of the mobile communication terminal is not geographical location information of a home location of the mobile communication terminal.

In greater detail, whether position information of the mobile communication terminal thus obtained is the geographical location information of the home location of the mobile communication terminal is determined according to the position information of the mobile communication terminal thus obtained. If it is the geographical location information of the home location of the mobile communication terminal, a HPLMN having a matching relationship with the geographical location information of the home location can be directly obtained from a preset matching table; if it is not the geographical location information of the home location of the mobile communication terminal, the VPLMN matching the geographical location information is selected according to the geographical location information of the mobile communication terminal.

The visited location adding unit 13 is configured to add the VPLMN to an EPLMN list.

In greater detail, the VPLMN is added to the EPLMN list. Since the PLMN has network identity information correspondingly, network identity of the VPLMN is preferably added to the EPLMN list. The network identity corresponds to network identity of an EPLMN. For example, the operator China Mobile has four network codes, namely, 46000, 46002, 46007 and 46008, and the operator China Unicom has three network codes 46001, 46006 and 46009, all of them are EPLMNs. The EPLMN list is stored in the mobile communication terminal, which is configured to store all the EPLMNs required during the network searching process.

The execution unit 14 is configured to perform a network search according to the EPLMN list thus added, perform a network registration operation of the mobile communication terminal when the VPLMN is searched.

In greater detail, perform the network search according to the EPLMN list thus added. Through a plurality of EPLMNs including the VPLMN and the HPLMN in the EPLMN list and the plurality of EPLMNs all having a same priority, a network that is first successfully searched during the network search serves as a network for the network registration operation of the mobile communication terminal. After the network is successfully searched, the network registration operation of the mobile communication terminal is performed according to the network or network identity thus searched.

According to the present embodiment, through obtaining the geographical location information of the mobile communication terminal, the VPLMN matching the geographical cal location information is selected according to the geographical location information of the mobile communication terminal when the geographical location information of the mobile communication terminal is not the geographical location information of the home location of the mobile communication terminal. The VPLMN is added to the EPLMN list. The network search is performed according to the EPLMN list thus added. When the VPLMN is searched, the network registration operation of the mobile communication terminal is performed. By using the method in which the VPLMN is selected according to the geographical location information, the time consumed by the mobile communication terminal in searching the network is reduced, thus increasing the network access efficiency.

A description is provided with reference to FIG. 4. FIG. 4 is a schematic diagram of a structure of another mobile communication terminal according to one embodiment of the present disclosure. A mobile communication terminal 2 includes an acquisition unit 21, a preset unit 22, a selection unit 23, a home location adding unit 24, a visited location adding unit 25, and an execution unit 26. The execution unit 26 includes a network searching subunit 261 and a network registration subunit 262.

The acquisition unit 21 is configured to obtain geographical location information of a mobile communication terminal through a positioning method in which a global positioning system (GPS of the mobile communication terminal is used.

In greater detail, when a subscriber carrying the mobile communication terminal goes from a home location to a visited location, or goes from a visited location A to a visited location B, the mobile communication terminal is turned on again after a network is switched or after the mobile communication terminal reaches a destination. When a network of a current destination is searched, geographical location information of the subscriber carrying the mobile communication terminal needs to be obtained so as to obtain a VPLMN correspondingly. Since the mobile communication terminal, such as a smart phone, carries the function of a GPS, the geographical location information of the mobile communication terminal can be obtained by using the positioning method achieved by GPS of the mobile communication terminal.

The preset unit 22 is configured to preset information of a matching table. The preset information of the matching table includes the geographical location information, VPLMNs having a matching relationship with the geographical location information, geographical location information of a home location, and an HPLMN having a matching relationship with the geographical location information of the home location. The matching table is configured to select a VPLMN matching the geographical location information according to the geographical location information of the mobile communication terminal.

In greater detail, after obtaining the geographical location information of the mobile communication terminal, it is necessary to obtain the VPLMN or the HPLMN according to the geographical location information of the mobile communication terminal thus obtained. Hence, the information of the matching table needs to be preset. The preset information of the matching table may be obtained through manually adding or through downloading a preset matching table when accessing a network in advance. The preset information of the matching table includes the geographical location information, and PLMNs having a matching relationship with the geographical location information. The PLMNs include the HPLMN and the VPLMNs.

The selection unit 23 is configured to select the VPLMN matching the geographical location information according to the geographical location information of the mobile communication terminal when the geographical location information of the mobile communication terminal is not the geographical location information of the home location of the mobile communication terminal.

In greater detail, whether position information of the mobile communication terminal thus obtained is the geographical location information of the home location of the mobile communication terminal is determined according to the position information of the mobile communication terminal thus obtained. If it is the geographical location information of the home location of the mobile communication terminal, the HPLMN having the matching relationship with the geographical location information of the home location can be directly obtained from the preset matching table; if it is not the geographical location information of the home location of the mobile communication terminal, the VPLMN matching the geographical location information is selected according to the geographical location information of the mobile communication terminal.

The home location adding unit 24 is configured to add the HPLMN to an EPLMN list.

In greater detail, when the subscriber carrying the mobile communication terminal needs to return to the home location from the visited location, or needs to go from the home location to the visited location, the HPLMN can be read from the mobile communication terminal, and the HPLMN is added to the EPLMN list for the subsequent network searching process.

The visited location adding unit 25 is configured to add the VPLMN to the EPLMN list.

In greater detail, when the subscriber carrying the mobile communication terminal needs to return to the home location from the visited location, or needs to go from the visited location A to the visited location B, the VPLMN can be read from the mobile communication terminal, and the VPLMN is added to the EPLMN list for the subsequent network searching process.

The execution unit 26 is configured to perform a network search according to the EPLMN list thus added, and perform a network registration operation of the mobile communication terminal when the VPLMN is searched. The execution unit 26 includes the network searching subunit 261 and the network registration subunit 262.

The network searching subunit 261 is configured to transmit a broadcasting-network access instruction according to the EPLMN list thus added to perform a network searching operation.

In greater detail, a network search is performed according to the EPLMN list thus added. Through a plurality of EPLMNs with the same priority including the VPLMNs and the HPLMN in the EPLMN list, the broadcasting-network access instruction includes all EPLMN information in the EPLMN list. When the network search is performed, the mobile communication terminal transmits the broadcasting-network access instruction and receives a broadcast message correspondingly to feed matched network information of the broadcast message that is successfully received back to the mobile communication terminal. When a feedback message is received, it shows that the mobile communication terminal successfully searches a PLMN.

The network registration subunit 262 is configured to perform the network registration operation of the mobile communication terminal when any one network of the VPLMNs in the EPLMN list is searched.

In greater detail, when the any one network of the VPLMNs in the EPLMN list is searched, for example, the visited location is China and China Unicorn 46001 is searched, the network registration operation can be performed according to a network code.

According to the present embodiment, the geographical location information of the mobile communication terminal is obtained through the positioning method in which the GPS of the mobile communication terminal is used and the information of the matching table is preset. When the geographical location information of the mobile communication terminal is not the geographical location information of the home location of the mobile communication terminal, select the VPLMN matching the geographical location information according to the geographical location information of the mobile communication terminal and add the HPLMN and the VPLMN to the EPLMN list. Then, transmit the broadcasting-network access instruction according to the EPLMN list thus added to perform the network searching operation. When the any one network of the VPLMNs in the EPLMN list is searched, the network registration operation of the mobile communication terminal is performed. Through using the GPS positioning method to obtain the geographical location information and through using the geographical location information to obtain the matched PLMN, the positioning can be more accurate and the EPLMN can be rapidly obtained to reduce the time consumed in accessing the network and at the same time increase the network access efficiency.

Figure 5:
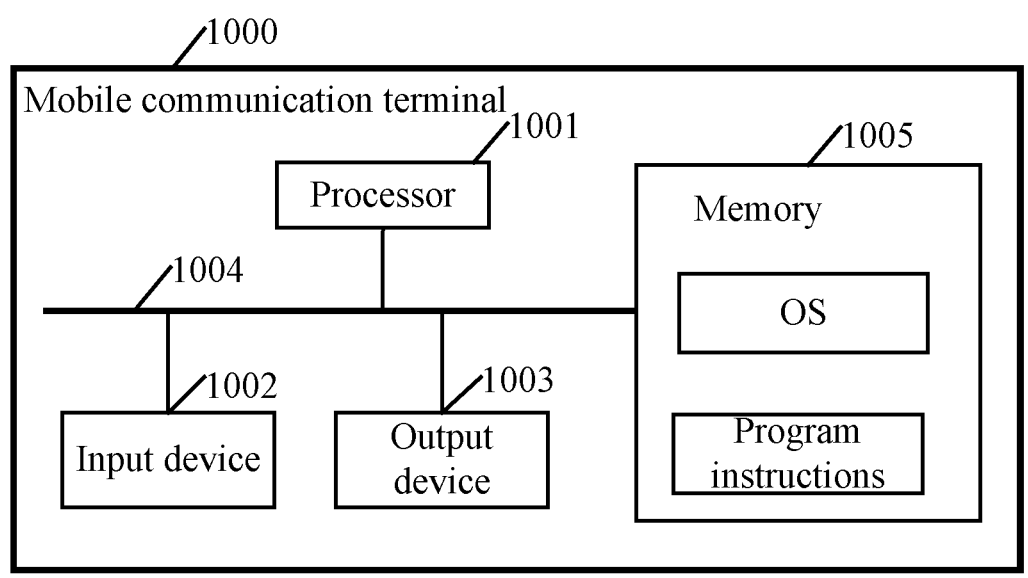
FIG. 5 is a block diagram of a mobile communication terminal according to a third embodiment of the present disclosure.

FIG. 5 is a block diagram of a mobile communication terminal according to a third embodiment of the present disclosure. The mobile communication terminal is configured to perform the above method of accessing the networks. A mobile communication terminal 1000 may include: elements such as at least one processor 1001, at least one input device 1002, at least one output device 1003, a memory 1005. These elements are communicatively connected through one or a plurality of buses 1004. Those of ordinary skill in the art would understand that the embodiment of the present disclosure is not limited to the structure of the mobile communication terminal shown in FIG. 5. It may be either a bus-type structure or a star-type structure, or may include more or fewer elements than illustrated, or some elements may be combined, or the elements may be arranged differently. The processor 1001 is a control center of the mobile communication terminal 1000. The processor 1001 is connected to various parts of the mobile communication terminal 1000 by utilizing various ports and circuits. Through running or executing a program and/or a module stored in the memory 1005, and using data stored in the memory 1005, the processor 1001 performs a variety of functions of the mobile communication terminal and processes data. The processor 1001 may be constituted by an integrated circuit (IC), for example, it may be formed by a single packaged IC, or may be formed by connecting a plurality of packaged ICs having a same function or different functions. For example, the processor 1001 may only include a central processing unit (CPU), or may be a combination of a CPU, a digital signal processor (DSP), a graphic processing unit (GPU), and various types of control chips. In the embodiment of the present disclosure, the CPU may be a single-core CPU or may include a multi-core CPU.

The input device 1002 includes a standard touch panel, a standard keyboard, etc., and may also include a wired port, a wireless port, etc.

The output device 1003 includes a display panel, a speaker, etc., and may also include a wired port, a wireless port, etc.

The memory 1005 may be configured to store a software program and the module. The processor 1001, the input device 1002, and the output device 1003 performs a variety of functional applications of the mobile communication terminal and achieve data processing through using the software program and the module stored in the memory 1005. The memory 1005 mainly includes a program storage area and a data storage area. The program storage area may store an operating system, an application program required by at least one function, or the like. The data storage area may store data or the like created according to uses of the mobile communication terminal. In the embodiment of the present disclosure, the operating system may be an Android system, an iOS system, a Windows operating system, or the like.

In greater detail, the processor 1001 executes the program instructions stored in the memory 1005 to perform the following operations:
  obtaining geographical location information of a mobile communication terminal;
  selecting a VPLMN matching the geographical location information according to the geographical location information of the mobile communication terminal when the geographical location information of the mobile communication terminal is not geographical location information of a home location of the mobile communication terminal;
  adding the VPLMN to an EPLMN list; and
  performing a network search according to the EPLMN list thus added, and performing a network registration operation of the mobile communication terminal when the VPLMN is searched.

Optionally, when the processor 1001 executes the plurality of program instructions to perform a step of obtaining the geographical location information of the mobile communication terminal, the processor 1001 executes the plurality of program instructions stored in the memory 1005 to perform a step of:
  obtaining the geographical location information of the mobile communication terminal through using a global positioning system of the mobile communication terminal.

Optionally, the processor 1001 further executes the plurality of program instructions to perform the following step before selecting the VPLMN matching the geographical location information according to the geographical location information of the mobile communication terminal when the geographical location information of the mobile communication terminal is not the geographical location information of the home location of the mobile communication terminal:
  presetting information of a matching table, the preset information of the matching table comprising the geographical location information, VPLMNs having a matching relationship with the geographical location information, the geographical location information of the home location, and an HPLMN having a matching relationship with the geographical location information of the home location; wherein the matching table is configured to select the VPLMN matching the geographical location information according to the geographical location information of the mobile communication terminal.

Optionally, the processor 1001 further executes the plurality of program instructions stored in the memory 1005 to perform the following step before adding the VPLMN to the EPLMN list:
  adding the HPLMN to the EPLMN list.

Optionally, the processor 1001 executes the plurality of program instructions to perform the step of performing the network search according to the EPLMN list thus added, and performing the network registration operation of the mobile communication terminal when the VPLMN is searched, the processor 1001 executes the plurality of program instructions to perform steps of:
  transmitting a broadcasting-network access instruction according to the EPLMN list thus added to perform a network searching operation; and performing the network registration operation of the mobile communication terminal when any one network of the VPLMNs in the EPLMN list is searched.

According to the embodiments of the present disclosure, through obtaining the geographical location information of the mobile communication terminal, the VPLMN matching the geographical location information is selected according to the geographical location information of the mobile communication terminal when the geographical location information of the mobile communication terminal is not geographical location information of a home location of the mobile communication terminal. The VPLMN is added to the EPLMN list. The network search is performed according to the EPLMN list thus added. The network registration operation of the mobile communication terminal is performed when the VPLMN is searched. By using the method in which the VPLMN is selected according to the geographical location information, the time spent by the mobile communication terminal in network searching can be reduced to increase the network access efficiency.

It is noted that, to simplify matters, each of the above method embodiments is described as a combination of a series of actions. However, those of ordinary skill in the art would understand that the present disclosure is not limited to the described sequence of actions since certain steps may be performed in other sequences or may be simultaneously performed according to the present disclosure. Moreover, those of ordinary skill in the art would understand that the embodiments described in the specification are all preferred embodiments, and the actions and module involved are not necessarily essential to the present disclosure.

In the above embodiments, the description of each of the embodiments has its own focus, and portions that are not described in detail in one embodiment can refer to the relevant description of another embodiment.

Through the description of the above embodiments, those of ordinary skill in the art can clearly understand that the present disclosure may be realized by using hardware, firmware, or a combination thereof. When the software is utilized, the above functions may be stored in a computer readable medium or may be one or a plurality of instructions or code in the computer readable medium that is transmitted. The computer readable medium includes a computer storage medium and a communication medium. The communication medium includes any medium that facilitates a computer program to be transmitted from one place to another place. A storage medium may be any usable medium that a computer can access. The computer readable medium may include but is not limited to a random access memory (RAM), a read-only Memory (ROM), an electrically erasable programmable read-only memory (EEPROM), a compact disc read-only memory (CD-ROM), or some other optical disc storage, a magnetic disk storage medium, or some other magnetic storage device, or any other medium that can be hand carried or can store expected program code in a form of instruction or data and can be accessed by a computer. In addition, any connection may be the computer readable medium if appropriate. For example, if the software is transmitted from a website, a server, or some other remote source by using a coaxial cable, a fiber optic cable, a twisted pair cable, a digital subscriber line (DSL), or a wireless technology, such as infrared, radio, and microwave, then the coaxial cable, the fiber optic cable, the twisted pair cable, the DSL, or the wireless technology, such as infrared, radio, or microwave is included in fixing of the medium. As used herein, "Disk" and "disc" include a compact disc (CD), a laser disc, an optical disc, a digital versatile disc (DVD), a floppy disk, or a Blu-ray disc. "Disk" usually magnetically replicates data whereas "disc" uses laser light to optically replicate data. The above combinations should also be within the protection range of the computer-readable media.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of accessing a network comprising:
    obtaining geographical location information of a mobile communication terminal;
    selecting a visited public land mobile network (VPLMN) matching the geographical location information according to the geographical location information of the mobile communication terminal when the geographical location information of the mobile communication terminal is not geographical location information of a home location of the mobile communication terminal;
    adding a home public land mobile network (HPLMN) to an equivalent public land mobile network (EPLMN) list;
    adding the VPLMN to the EPLMN list, wherein the EPLMN list stores EPLMNs comprising the VPLMN and the HPLMN; and
    performing a network search according to the EPLMN list, and performing a network registration operation of the mobile communication terminal when the VPLMN is searched;
    wherein the method further comprises the following step before selecting the VPLMN matching the geographical location information according to the geographical location information of the mobile communication terminal when the geographical location information of the mobile communication terminal is not the geographical location information of the home location of the mobile communication terminal:
    presetting information of a matching table, the preset information of the matching table comprising the geographical location information, VPLMNs having a matching relationship with the geographical location information, the geographical location information of the home location, and an HPLMN having a matching relationship with the geographical location information of the home location; wherein the matching table is configured to select the VPLMN matching the geographical location information according to the geographical location information of the mobile communication terminal.

2. The method as claimed in claim 1, wherein obtaining the geographical location information of the mobile communication terminal comprises:
    obtaining the geographical location information of the mobile communication terminal through using a global positioning mobile communication terminal of the mobile communication terminal.

3. The method as claimed in claim 1, wherein performing the network search according to the EPLMN list thus added, and performing the network registration operation of the mobile communication terminal when the VPLMN is searched comprise:

transmitting a broadcasting-network access instruction according to the EPLMN list thus added to perform a network searching operation; and performing the network registration operation of the mobile communication terminal when any one network of the VPLMNs in the EPLMN list is searched.

4. A mobile communication terminal comprising:
an acquisition unit configured to obtain geographical location information of the mobile communication terminal;
a selection unit configured to select a VPLMN matching the geographical location information according to the geographical location information of the mobile communication terminal when the geographical location information of the mobile communication terminal is not geographical location information of a home location of the mobile communication terminal;
a home location adding unit configured to add a home public land mobile network (HPLMN) to an equivalent public land mobile network (EPLMN) list;
a visited location adding unit configured to add the VPLMN to the EPLMN list, wherein the EPLMN list stores EPLMNs comprising the VPLMN and the HPLMN; and
an execution unit configured to perform a network search according to the EPLMN list, and perform a network registration operation of the mobile communication terminal when the VPLMN is searched;
further comprising:
a preset unit configured to preset information of a matching table, the preset information of the matching table comprising the geographical location information, VPLMNs having a matching relationship with the geographical location information, the geographical location information of the home location, and an HPLMN having a matching relationship with the geographical location information of the home location; wherein the matching table is configured to select the VPLMN matching the geographical location information according to the geographical location information of the mobile communication terminal.

5. The mobile communication terminal as claimed in claim 4, wherein the acquisition unit is configured to obtain the geographical location information of the mobile communication terminal through using a global positioning mobile communication terminal of the mobile communication terminal.

6. The mobile communication terminal as claimed in claim 4, wherein the execution unit comprises:
a network searching subunit configured to transmit a broadcasting-network access instruction according to the EPLMN list thus added to perform a network searching operation; and
a network registration subunit configured to perform the network registration operation of the mobile communication terminal when any one network of the VPLMNs in the EPLMN list is searched.

7. A mobile communication terminal comprising a processor and a memory storing a plurality of program instructions executable by the processor to perform the following steps:
obtaining geographical location information of a mobile communication terminal;

selecting a VPLMN matching the geographical location information according to the geographical location information of the mobile communication terminal when the geographical location information of the mobile communication terminal is not geographical location information of a home location of the mobile communication terminal;
adding a home public land mobile network (HPLMN) to an equivalent public land mobile network (EPLMN) list;
adding the VPLMN to the EPLMN list, wherein the EPLMN list stores EPLMNs comprising the VPLMN and the HPLMN; and
performing a network search according to the EPLMN list, and performing a network registration operation of the mobile communication terminal when the VPLMN is searched;
wherein the processor further executes the plurality of program instructions to perform the following step before selecting the VPLMN matching the geographical location information according to the geographical location information of the mobile communication terminal when the geographical location information of the mobile communication terminal is not the geographical location information of the home location of the mobile communication terminal:
presetting information of a matching table, the preset information of the matching table comprising the geographical location information, VPLMNs having a matching relationship with the geographical location information, the geographical location information of the home location, and an HPLMN having a matching relationship with the geographical location information of the home location; wherein the matching table is configured to select the VPLMN matching the geographical location information according to the geographical location information of the mobile communication terminal.

8. The mobile communication terminal as claimed in claim 7, wherein when the processor executes the plurality of program instructions to perform a step of obtaining the geographical location information of the mobile communication terminal, the processor executes the plurality of program instructions to perform a step of:
obtaining the geographical location information of the mobile communication terminal through using a global positioning mobile communication terminal of the mobile communication terminal.

9. The mobile communication terminal as claimed in claim 7, wherein the processor executes the plurality of program instructions to perform the step of performing the network search according to the EPLMN list thus added, and performing the network registration operation of the mobile communication terminal when the VPLMN is searched, the processor executes the plurality of program instructions to perform steps of:
transmitting a broadcasting-network access instruction according to the EPLMN list thus added to perform a network searching operation; and
performing the network registration operation of the mobile communication terminal when any one network of the VPLMNs in the EPLMN list is searched.

* * * * *